April 9, 1946.  E. FEHR  2,398,089

GAS SAFETY DEVICE

Filed July 17, 1943

Edmond Fehr
INVENTOR

BY
his ATTORNEY.

Patented Apr. 9, 1946

2,398,089

UNITED STATES PATENT OFFICE 2,398,089

GAS SAFETY DEVICE

Edmond Fehr, Neuchatel, Switzerland

Application July 17, 1943, Serial No. 495,128
In Switzerland June 17, 1942

8 Claims. (Cl. 137—153)

The present invention relates to gas safety devices and in particular to a gas safety device of the type adapted to be fitted in gas conduits and comprising a diaphragm controlling a valve provided with a leak gas passage.

In using gas consuming apparatus, as for instance gas boilers, gas stoves, etc., a great danger arises in the case of an interruption of the gas supply from the fact that gas cocks of burners in use at the moment of the interruption are frequently left open so that, when the supply is restored, gas can escape from said gas cocks.

Gas safety devices have been developed which operate, after each interruption of the gas supply, to prevent the admission of gas to the consuming apparatus unless all the cocks of the gas burners eventually having been left open are closed.

Known gas safety devices designed for this purpose include a diaphragm rigidly connected with a valve provided with a leak passage. In these known constructions, the rigid connection between the diaphragm and valve had the disadvantage that, although the valve closed immediately on deficiency of gas, upon renewed gas supply it takes a comparatively long time after the closing of all the gas cocks to re-open the valve because the small quantity of gas escaping through the leak passage into the admitting pipe of the gas consuming apparatus will only gradually increase the gas pressure to the normal value at which the valve opens. If the valve were constructed for an opening pressure substantially below the normal gas pressure in order to quicken the opening process, it would tend to open on renewed gas supply even if some of the gas cocks on the consuming apparatus are still open.

It is the object of the present invention to overcome these disadvantages of hitherto known gas safety devices by providing a lost motion connection between the diaphragm and the valve.

A further object of the invention is the provision of a diaphragm controlled locking device, for the valve whereby the valve is automatically closed and locked on interruption of the gas supply, while on rising of the gas pressure in the valve housing the locked valve is released.

Another object of the invention consists in providing means for cleaning the leak gas passage of the valve from deposited impurities, such as for instance soot or dust carried by the gas, and for preventing the deposit of such impurities, when the valve is open.

With the foregoing and other objects in view, the invention will be more fully described hereinafter, and will be more particularly pointed out in the claims appended hereto.

In the drawing, which shows, by way of example, one embodiment of the invention:

Figure 1:
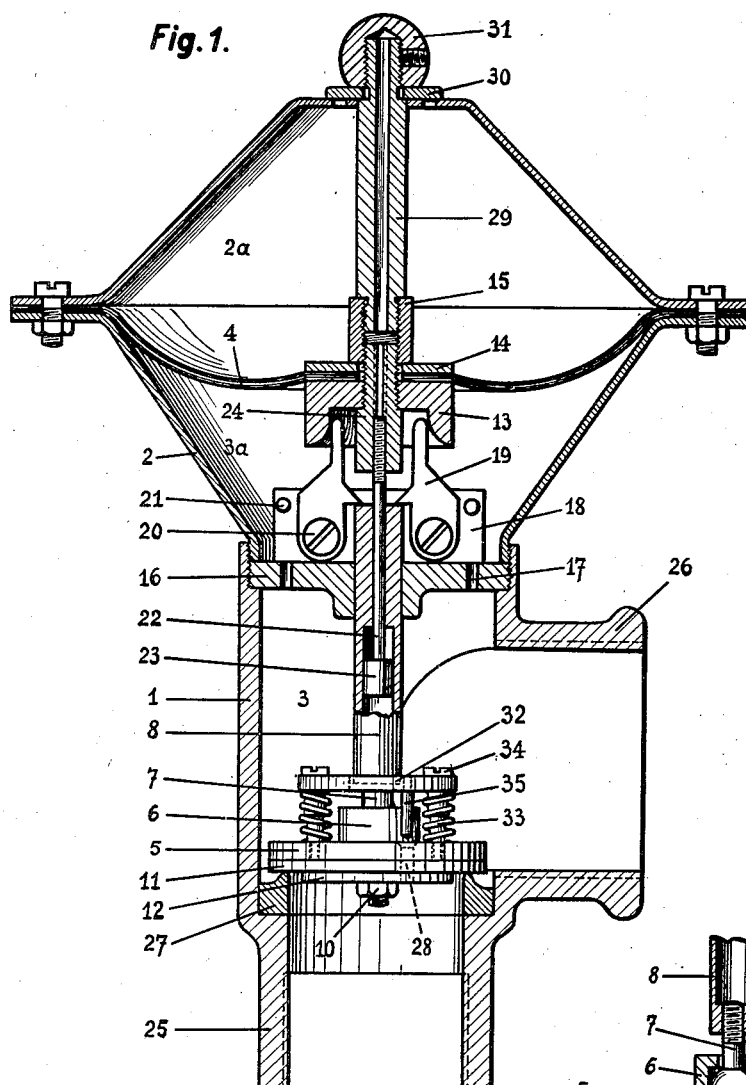
Figure 1 is an axial section through a gas safety device.
Figure 2:
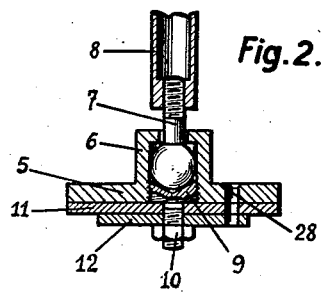
Figure 2 shows a detail of Figure 1.

I denotes a valve housing having mounted thereon a capsule 2 consisting of two flanged parts bolted together along their annular flanges. An annular diaphragm 4 is clamped with its outer periphery between the flanges of the two capsule parts and subdivides the capsule 2 in two chambers 2a and 3a. The inlet port 25 in the lower portion of the valve housing is provided with an annular valve seat 27 supporting the valve in its closed position. The valve includes a disc 5 provided on its seating side with a gasket 11 fixed to the disc 5 by means of the metal washer 12 and the screw nut 10. The valve disc 5 and the lower sleeve-like part 8 of the telescope-like valve rod are connected with each other by a ball and socket joint located in the hollow head 6 of the valve disc 5 and comprising a ball piece 7 screwed into part 8 of the valve rod and a screw piece 9 screwed into the valve and carrying the nut 10. Owing to the ball and socket joint the valve disc 5 is sufficiently movable, so that the valve closes tightly. The part 8 of the valve rod is guided in a central hole provided in a cover plate 16 closing the top of the housing 1 and extends with its upper end into the chamber 3a of the capsule 2. The upper part 22 of the valve rod is axially slidable in the lower part 8 thereof and carries at its lower end a piston 23 which serves as a stop on maximum extension of the telescope-like valve rod in co-operation with a shoulder in the rod part 8. The upper portion of the rod part 22 is screwed into a threaded piece 24 which carries a guide member 13 having a flared guide surface. The diaphragm 4 is centrally traversed by said threaded piece 24 and its inner periphery is clamped between the guide member 13 and a washer 14 by means of a nut 15 screwed upon the threaded piece 24.

The cover plate 16 which forms the top of the valve housing 3 is provided on its upper side with a cast-on rib 18 which extends in a plane substantially tangential to the central hole in the plate 16. Two locking levers 19 are pivoted on the rib 18 by means of screws 20 for rocking movements in a plane containing the axis of the valve rod. Each lever 19 has a nose which, in locking position, bears against the upper end of the rod part 8. In this position, the levers 19 are kept stationary by the engagement of their free ends in the guide member 13. Pins 21 on the rib 18 form stops for the levers 19 in order to limit their outward movement, so that the ends of the lever arms in their outermost position remain in the range of the guide member 13 for being restored to their locking positions. The valve housing 3 and the chamber 3a in the capsule 2 below the membrane 4 communicate through the holes 17 in the cover plate 16. The gas pipe leading to the gas consuming apparatus must be connected to the outlet port 26.

The valve rod is provided above the membrane 4 with an extension piece 29 screwed into the nut 15 and extending with its free end through a hole in the top of capsule 2. A washer 30 and a ball nut 31 are mounted on the protruding end of the rod extension 29.

The leak passage is formed by an eccentrically disposed bore 28 through the valve disc 5, gasket 11 and the metal washer 12. A ring 32 is mounted above the valve disc 5 by means of two screws 34 screwed into the valve disc 5 and it is spaced from the latter by two compression springs 33 disposed on the screws 34. The ring 32 carries a pin 35 with a downwardly directed point in alignment with the bore 28 so that upon movement of the valve disc 5 relative to the ring 32 against the action of the springs 33, the pin 35 penetrates into the bore 28 of the leak passage. The pin 35 corresponds in diameter with the bore 28 so that the latter is scoured when it is moved relatively to the pin.

The above described gas safety device operates as follows: On interruption of the gas supply, the gas pressure in the conduit and in the chamber 3a below the membrane falls. The guide member 13 together with the valve rod 8, 22 and the valve sink into locking position, wherein the valve disc 5 is applied with the gasket 11 to the valve seat 27. During this movement the guide member acts with its flared surface upon the levers 19 to restore them from their outermost positions to their locking positions, wherein the noses of the levers 19 bear against the top end of the rod part 8. The valve is thus locked in closed position against growing gas pressure in the admitting conduit.

On renewal of the gas supply, a very small quantity of gas escapes through the leak passage into the valve housing 3. If a gas cock has been left open at a gas consuming apparatus connected to the conduit wherein the gas safety device is fitted, the said small quantity of gas escapes into the open air without noxious consequences. As soon as all gas cocks at the consuming apparatus are closed, the gas pressure increases in the valve housing 3 and equally in the chamber 3a below the diaphragm 4. Owing to this increase in gas pressure, the diaphragm 4 together with the rod part 22 is lifted, the locking of the levers 19 by the guide member 13 is successively suspended and the piston 23 at the lower end of the rod part 22 reaches and pushes against the inner shoulder of the rod part 8. This slight thrust together with the full gas pressure on the underside of the valve disc 5 are sufficient to open the valve a little. In consequence the gas pressure under the diaphragm 4 increases almost instantaneously to the normal value, whereby the diaphragm together with the guide member 13, the valve rod 8, 22 and the valve are fully lifted into the opening position. The locking levers 19 tilt outwardly and bear against the stop pins 21.

Towards the end of the lifting movement, the ring 32 carrying the pin 35 abuts against the nave of the cover plate 16. The diaphragm 4, however, continues to lift the valve disc 5 against the action of the compression springs 33, so that the pin 35 penetrates into the bore 28 of the leak passage and scours therefrom any deposits of impurities, such as dust or soot. The valve disc remains, at the normal gas pressure for which the device is constructed, in full opening position and the pin 35 fills up the bore of the secondary gas passage, so that no deposits can be formed therein. However, the diaphragm 4, together with the valve reacts to small fluctuations of the gas pressure by sinking and lifting movements. Thus, the leak passage is moved relatively to the pin and is slightly scoured.

On interruption of the gas supply the gas pressure below the diaphragm 4 falls and the valve arrives again in the locking position shown in the drawing. The guide member 13 reengages the free ends of the levers 19 and restores the latter from their outermost positions to their locking positions.

The lowest position of the guide member 13 is determined by the washer 30 when resting upon the capsule 2. All other positions of the guide member and of the valve are indicated by the protruding length of the rod extension 29, which may be provided with graduation marks.

The pin 35 may be provided with radial or spiral grooves, the edges of which improve the scouring effect.

To give an idea of the reliability in service of the gas safety device according to the present invention, it may, for instance, be stated that the valve will not open as long as a gas cock at a connected gas consuming apparatus is left open, even if for any reason the gas pressure in the feeding conduit under the valve disc 5 would grow to a pressure above atmospheric of 2 atmospheres. On the other hand, when all gas cocks at the connected gas consuming apparatus are closed, the closed valve will re-open at a gas pressure above atmospheric of about 0.005 of one atmosphere under the diaphragm.

It is understood that the gas safety device according to the invention may also be used without the cleaning means for the leak passage or without the rod extension 29.

What I claim is:

1. A gas safety device comprising a housing adapted to be fitted in a gas conduit and provided with a gas inlet port including a valve seat and with a gas outlet port, a diaphragm mounted in said housing with one surface thereof exposed to the gas pressure prevailing in a part of said housing, a valve arranged in said housing for cooperation with said valve seat to control the flow of gas from said inlet port into said housing, a lost motion connection between said valve and said diaphragm, means for locking said valve in its closed position, and means carried by said diaphragm to operate said locking means during the lost motion movement of said diaphragm in the valve closing direction to its locking position and to release said locking means during the lost motion movement of said diaphragm in the opposite direction.

2. A gas safety device, as claimed in claim 1, wherein said valve is provided with a leak passage.

3. A gas safety device, as claimed in claim 1, wherein said valve locking means includes at least one lever mounted in said housing and rockable between a locking position in which a part thereof engages a part of the closed valve and an inoperative position in which the valve is freed for opening, and said means for operating said locking means includes a guide member carried by said diaphragm and having a guide surface formed to engage part of said lever for guiding the same into its locking position during the lost motion movement of said diaphragm in the valve closing direction.

4. A gas safety device, as claimed in claim 1, wherein said valve locking means includes at least one lever mounted in said housing and rockable in a plane containing the valve axis between a locking position in which a part thereof engages a part of the closed valve and an inoperative position in which the valve is freed for opening, and said means for operating said locking means includes a guide member carried by said diaphragm and having a flared guide surface to engage an arm of said lever for guiding the same into its locking position during the lost motion movement of said diaphragm in the valve closing direction.

5. A gas safety device, as claimed in claim 1, in which said lost motion connection between said valve and diaphragm includes a two-part telescope-like valve rod including means to limit its maximum extension.

6. A safety device, as claimed in claim 1, in which said lost motion connection between said valve and diaphragm includes a two-part telescope-like valve rod having one part fixed to the diaphragm and the other part articulated to the valve and including means to limit its maximum extension.

7. A gas safety device, as claimed in claim 1, in which said valve is provided with a leak passage and mechanical means are provided to penetrate into said leak passage for cleaning the same at a certain stage of the opening movement of the valve.

8. A gas safety device, as claimed in claim 1, in which said valve is provided with a leak passage and a support is resiliently mounted on said valve at a certain distance above its inner surface, said support being arranged to abut against a part of the housing when the valve, during its opening movement, reaches a predetermined position short of its fully open position, a pin projecting from said support towards said valve in alignment with and normally outside of said leak passage to penetrate into the latter and to scour the same as the valve vacillates between said predetermined position and its fully open position.

EDMOND FEHR.